(12) United States Patent
Yukawa et al.

(10) Patent No.: US 7,167,203 B1
(45) Date of Patent: Jan. 23, 2007

(54) DIGITAL CAMERA HAVING CONTROLLER FOR REDUCING OCCURRENCES OF BLUR IN DISPLAYED IMAGES

(75) Inventors: Kazuhiko Yukawa, Sakai (JP); Masahito Niikawa, Sakai (JP)

(73) Assignee: Minolta, Co., Ltd., Osaka (JP)

( * ) Notice: Subject to any disclaimer, the term of this patent is extended or adjusted under 35 U.S.C. 154(b) by 0 days.

(21) Appl. No.: 09/362,715

(22) Filed: Jul. 29, 1999

(30) Foreign Application Priority Data

Jul. 30, 1998 (JP) .............................. H10-215389

(51) Int. Cl.
 *H04N 5/232* (2006.01)
 *H04N 5/222* (2006.01)
 *G03B 13/00* (2006.01)
 *G03B 13/32* (2006.01)
 *G03B 3/00* (2006.01)

(52) U.S. Cl. .................. 348/357; 348/333.01; 348/345; 396/90

(58) Field of Classification Search ................ 348/357, 348/345, 240.3, 333.01, 333.06, 333.07, 348/347, 333.13; 396/76, 80, 82, 86, 87, 396/90, 102
See application file for complete search history.

(56) References Cited

U.S. PATENT DOCUMENTS

| | | | | |
|---|---|---|---|---|
| 4,963,985 A | * | 10/1990 | Isoguchi et al. | 348/348 |
| 5,122,880 A | * | 6/1992 | Nagano | 348/333.13 |
| 5,172,151 A | | 12/1992 | Yomogizawa et al. | |
| 5,296,970 A | | 3/1994 | Morizumi | |
| 5,424,776 A | * | 6/1995 | Hirasawa | 348/345 |
| 5,751,351 A | * | 5/1998 | Mogi | 348/345 |
| 5,819,120 A | * | 10/1998 | Hamada et al. | 396/77 |
| 5,826,118 A | * | 10/1998 | Koga et al. | 396/87 |
| 6,097,548 A | * | 8/2000 | Funahashi et al. | 359/694 |
| 6,101,339 A | * | 8/2000 | Miki et al. | 396/301 |
| 6,166,765 A | * | 12/2000 | Toyofuku | 348/220.1 |
| 6,184,931 B1 | * | 2/2001 | Kaneda | 348/372 |
| 6,392,702 B1 | * | 5/2002 | Arai et al. | 348/335 |
| 6,459,857 B2 | * | 10/2002 | Kawamura et al. | 348/376 |
| 6,519,003 B1 | * | 2/2003 | Swayze | 348/333.01 |
| 6,643,458 B2 | * | 11/2003 | Sakamoto | 396/76 |

(Continued)

FOREIGN PATENT DOCUMENTS

JP 55-026539 2/1980

(Continued)

*Primary Examiner*—David Ometz
*Assistant Examiner*—John M. Villecco
(74) *Attorney, Agent, or Firm*—Buchanan Ingersoll & Rooney PC (57) ABSTRACT

A digital camera comprises a camera body and an image sensing unit. The image sensing unit is provided with a taking lens and an image sensing device for taking images and with an optical viewfinder. The camera body is provided with a controller for controlling the camera, signal processing circuits for processing signals from the image sensing device, a display device for displaying images taken and an interface for recording images taken onto a memory card. The display device serves as a viewfinder. In taking a image, the controller performs an AF control of the taking lens. When power supply to the camera is started, and when the display device is activated, the controller sets the taking lens at a predetermined focus position where in-focus condition is obtained for distant to close-range views, so that blurred images are not displayed on the display device.

9 Claims, 7 Drawing Sheets

U.S. PATENT DOCUMENTS 6,812,967 B1 * 11/2004 Niikawa et al. ....... 348/333.05
2006/0187332 A1 * 8/2006 Seki ...................... 348/333.01

FOREIGN PATENT DOCUMENTS

| JP | 57085011 A | * | 5/1982 |
| JP | 01131539 A | * | 5/1989 |
| JP | 06123914 A | * | 5/1994 |
| JP | 06-233172 | | 8/1994 |
| JP | 07151952 A | * | 6/1995 |
| JP | 08125914 A | * | 5/1996 |
| JP | 09098314 A | * | 4/1997 |
| JP | 09312797 | | 12/1997 |
| JP | 2001117542 A | * | 4/2001 |

\* cited by examiner

DIGITAL CAMERA HAVING CONTROLLER FOR REDUCING OCCURRENCES OF BLUR IN DISPLAYED IMAGES

This application is based on application No. H10-215389 filed in Japan on Jul. 30, 1998, the entire content of which is hereby incorporated by reference.

BACKGROUND OF THE INVENTION

1. Field of the Invention

The present invention relates to a digital camera that converts a subject image into electric signals and records the electric signals.

2. Description of the Prior Art

In recent years, with the development of the semiconductor technology such as image sensing devices, CPUs and memories, so-called digital cameras have become widespread in which a subject image is converted into image signals by use of an image sensing device such as a CCD instead of film, and after processed by a CPU, the image signals are recorded onto recording device.

Digital cameras are provided with live view displaying device for displaying an image currently taken by the image sensing device through the taking lens. The live view displaying device can be used as the viewfinder. Moreover, in view of the fact that the power consumption is great when only the live view displaying device is used as the viewfinder, some digital cameras also have optical viewfinders so that switching can be made between the optical viewfinder and the live view displaying device.

When the number of pixels of the image sensing device is small, although focusing is unnecessary at the wide-angle condition to a zoom magnification of 3×, focusing becomes necessary as the number of pixels increases. However, in conventional digital cameras, sufficient consideration is not given to the relationship between the start timing of driving of the live view displaying device and the timing of focusing.

SUMMARY OF THE INVENTION

An object of the present invention is to provide a digital camera in which the possibility that a blurred image is displayed on the live view displaying device is reduced.

To achieve the above-mentioned object, according to one aspect of the present invention, a camera comprises: a taking lens; an image sensing device for sensing a subject image formed by the taking lens; a display device for displaying the subject image sensed by the image sensing device; and a controller for driving the taking lens to a focus position where in-focus condition is substantially obtained for distant to close-range views when the camera starts to operate.

According to another aspect of the present invention, a camera comprises: a taking lens; an image sensing device for sensing a subject image formed by the taking lens; a display device for displaying the subject image sensed by the image sensing device; and a controller for driving the taking lens to a focus position where in-focus condition is substantially obtained for distant to close-range views before display by the display device is started.

According to still another aspect of the present invention, a camera body comprises: a display device for displaying an image captured; and a controller for controlling image taking so that in-focus condition is substantially obtained for distant to close-range views before display by the display device is started.

Moreover, according to still another aspect of the present invention, a display control method in a digital camera having a display device comprises the steps of: determining whether display of an image taken is requested or not; when the display is requested, driving a taking lens to a focus position where in-focus condition is substantially obtained for distant to close-range views; and displaying an image taken through the taking lens situated at that focus position.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Figure 1:
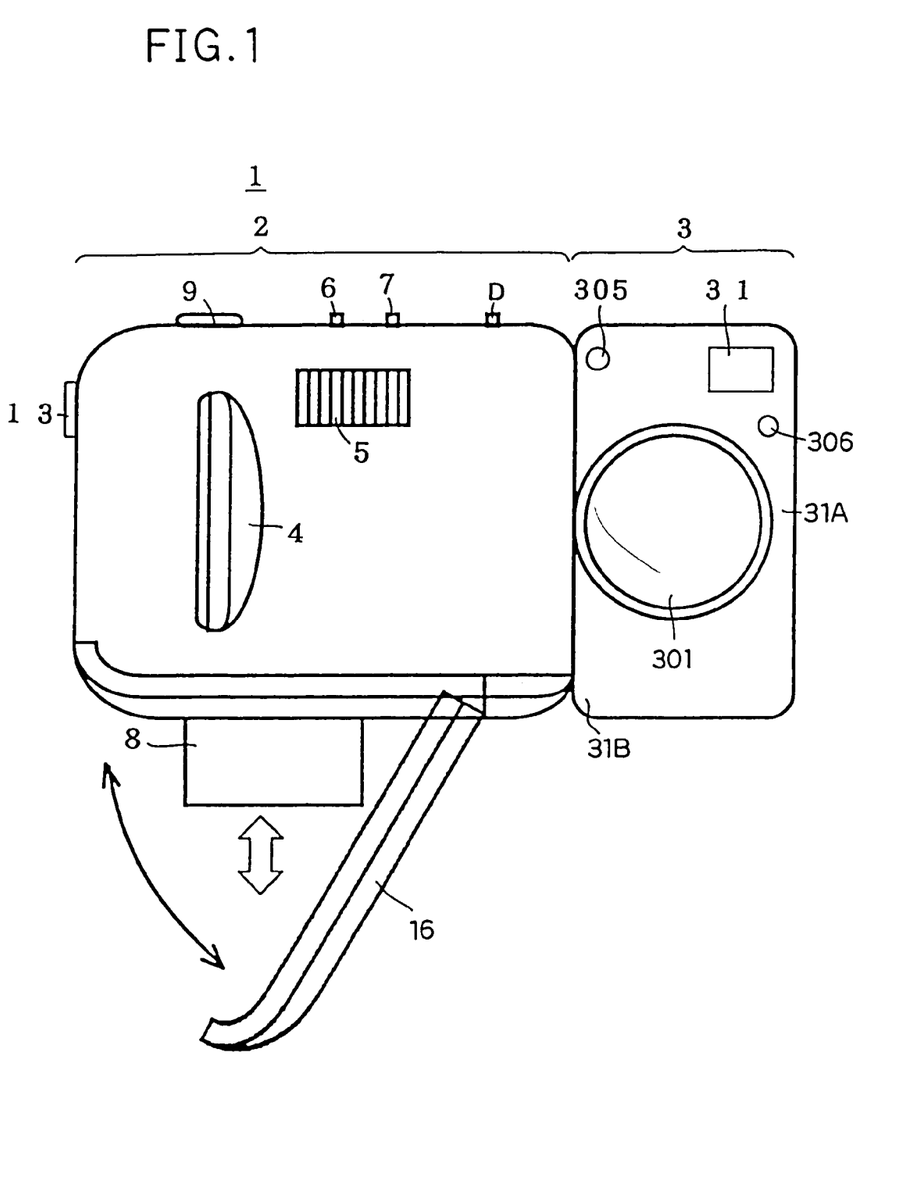
FIG. 1 is a front view of the appearance of a digital camera according to an embodiment of the present invention.

A digital camera according to the present invention will be described with reference to the drawings. A digital camera 1 according to an embodiment of the present invention has a box-shaped camera body 2 and a rectangular-parallelepiped-shaped image sensing unit 3 as illustrated in FIG. 1 showing a front view of the appearance thereof. First, the camera body 2 will be described. On the front surface of the camera body 2, a grip 4 is disposed in an appropriate position in a left end part, and a built-in flash 5 is disposed in an appropriate upper position in a right end part. On the top surface of the camera body 2, switches 6 and 7 for advancing frames when recorded images are reproduced are disposed substantially in the center.

The switch 6 is for advancing frames of recorded images in a direction that increases the frame number that is, a direction of the order of shooting (hereinafter, the switch 6 will be referred to as "UP switch"). The switch 7 is for advancing frames of recorded images in a direction that decreases the frame number (hereinafter, the switch 7 will be referred to as "DOWN switch"). An erasing switch D for erasing image data recorded on a memory card 8 is disposed on the right side of the DOWN switch 7 when viewed from the front, and a shutter button 9 is disposed on the left side of the UP switch 6. The shutter button 9 is a two-step switch as employed by silver halide film cameras where a half-depressed condition (S1) and a fully-depressed condition (S2) can be detected.

Figure 2:
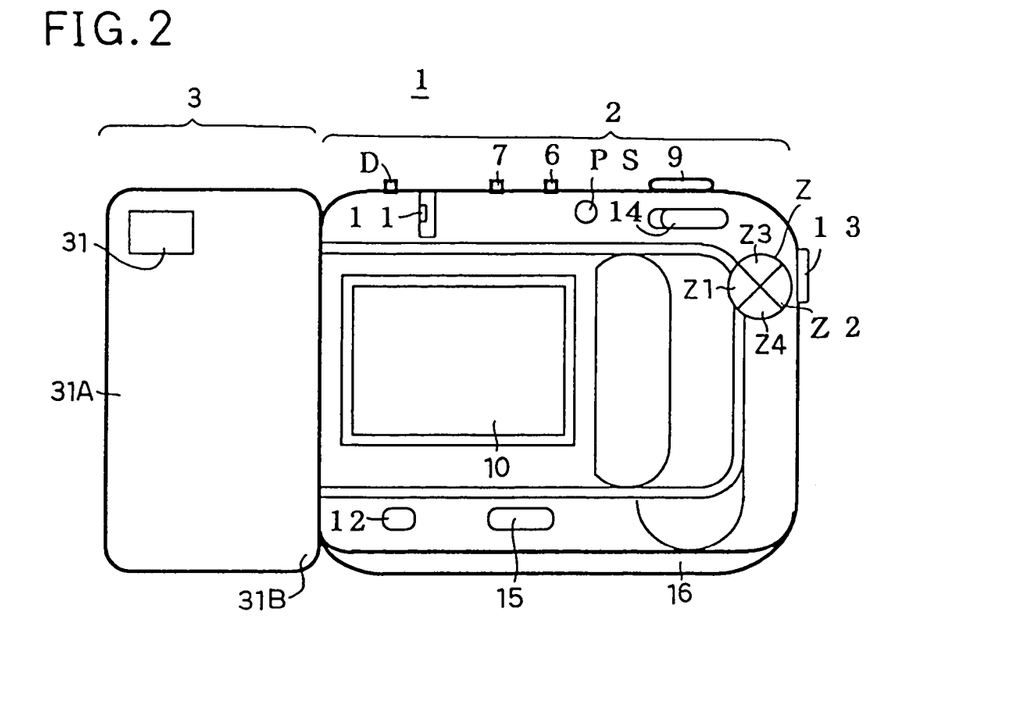
FIG. 2 is a back view of the appearance of the digital camera according to the embodiment of the present invention.

On the back surface of the camera body 2, as shown in FIG. 2, an LCD 10 for performing monitor display (corresponding to the live viewfinder) of shot images and reproduction display of recorded images is disposed substantially in the center in the left end part. An FL(flash) mode setting switch 11 is disposed above the LCD 10, and a compression rate setting slide switch 12 for switching the compression rate K of image data recorded on the memory card 8 is disposed below the LCD 10. Moreover, a power switch PS for activating and deactivating the driving of the camera body 2 is disposed. Further, a connecting terminal 13 to which a personal computer is externally connected is disposed on the right side surface when viewed from the back.

The digital camera 1 has the following modes for flash light 1 emission: "auto flash mode" in which the built-in flash 5 automatically fires in accordance with the subject brightness; "forced flash mode" in which the built-in flash 5 is forced to fire irrespective of the subject brightness; and "flash cancel mode" in which the built-in flash 5 is inhibited from firing. Every time the FL mode setting switch 11 is depressed, the "auto flash mode", the "forced flash mode" and the "flash cancel mode" are cyclically switched so that one of the modes is selected.

In the digital camera 1, the compression rate K can be selected between ⅛ and ½₀. For example, when the compression rate setting switch 12 is slid rightward, the compression rate K is set to ⅛, and when the switch 12 is slid leftward, the compression rate K is set to ½₀. While the compression rate K can be switched between two compression rates in this embodiment, the digital camera 1 may be designed so that the compression rate K can be selected from among three or more compression rates.

An LCD switch 15 for switching between ON and OFF of the LCD 10 (switching between driving the LCD 10 and not driving the LCD 10) is disposed below the LCD 10. Every time the LCD switch 15 is depressed, ON and OFF of the LCD 10 are cyclically switched.

This is realized by the following control: A subsequently-described general controller 211 in the camera body 2 has a non-volatile memory, and a predetermined area of the memory is used as an LCD flag indicating whether the LCD 10 is ON or OFF (this flag indicates that the LCD 10 is ON when it is "1" and that the display 10 is OFF when it is "0"). When the LCD switch 15 is operated, the LCD 10 is turned off when the LCD flag is 1, and the LCD 10 is turned on when the LCD flag is 0.

A shooting/reproduction mode setting switch 14 for switching between a "shooting mode" and a "reproduction mode" is disposed in an upper part at the right end of the back surface of the camera body 2. The shooting mode is for performing shooting. The reproduction mode is for performing reproduction display of shot images recorded on the memory card 8 on the LCD 10. The shooting/reproduction mode setting switch 14 is also a two-position slide switch. For example, when the switch 14 is slid rightward, the reproduction mode is set, and when the switch 14 is slid leftward, the shooting mode is set.

A four-contact switch Z comprising four buttons Z1 to Z4 each having a contact is disposed in an upper right part of the back surface of the camera body 2. The button Z1 is for moving in the wide-angle direction a front lens unit 3011 included in a taking lens 301 in the subsequently-described image sensing unit 3, and the button Z2 is for moving the front lens unit 3011 in the telephoto direction. That is, the buttons Z1 and Z2 are for zooming that focal length of the taking lens is changed.

The button Z3 is for exposure compensation in the positive direction, and the button Z4 is for exposure compensation in the negative direction. Even when the apparent brightness of the subject changes as the focal length is changed, the most suitable exposure value can manually be set by depressing the exposure compensating buttons. Since the zoom buttons Z1 and Z2 and the exposure compensating buttons Z3 and Z4 are formed as one four-contact switch Z, these buttons can be operated with one hand. Thus, the operability is excellent.

Figure 3:
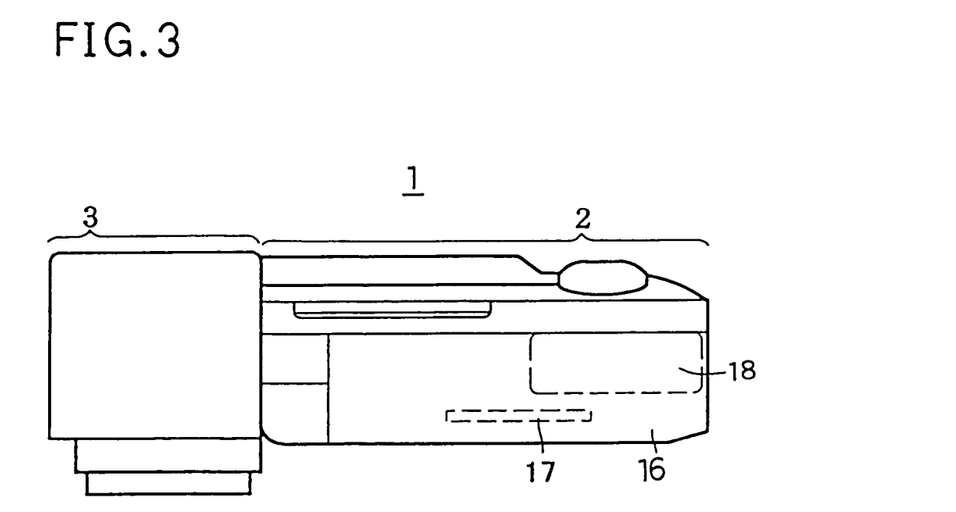
FIG. 3 is a bottom view of the appearance of the digital camera according to the embodiment of the present invention.

On the bottom surface of the camera body 2, as shown in FIG. 3, a card chamber 17 for the memory card 8 and a battery chamber 18 are provided. The openings of the chambers 17 and 18 are closed by a clamshell-type lid 16. The digital camera 1 of this embodiment is designed to use as the drive source four AA batteries connected in series or commercial AC power by connecting an AC adapter.

In summary, the camera body 2 mainly performs, after performing a predetermined signal processing on the image signals taken by the subsequently-described image sensing unit 3, processings such as display of the image signals on the LCD 10, recording of the image signals onto the memory card 8 and transfer of the image signals to a personal computer through the connecting terminal 13.

Subsequently, the image sensing unit 3 will be described. As shown in FIG. 1, the image sensing unit 3 is detachably attached to the right side surface of the camera body 2 when viewed from the front. The image sensing unit 3 has an image sensing unit main body 31A of a longitudinally elongated rectangular parallelepiped shape having a length substantially the same as the along-the-height length of the camera body 2 and having depth slightly larger than that of the camera body 2. An attaching member 31B used for attaching the image sensing unit 3 to the camera body 2 is provided on one side surface of the image sensing unit main body 31A. Moreover, an optical viewfinder 31 as well known in association with silver halide film cameras is provided.

Figure 4:
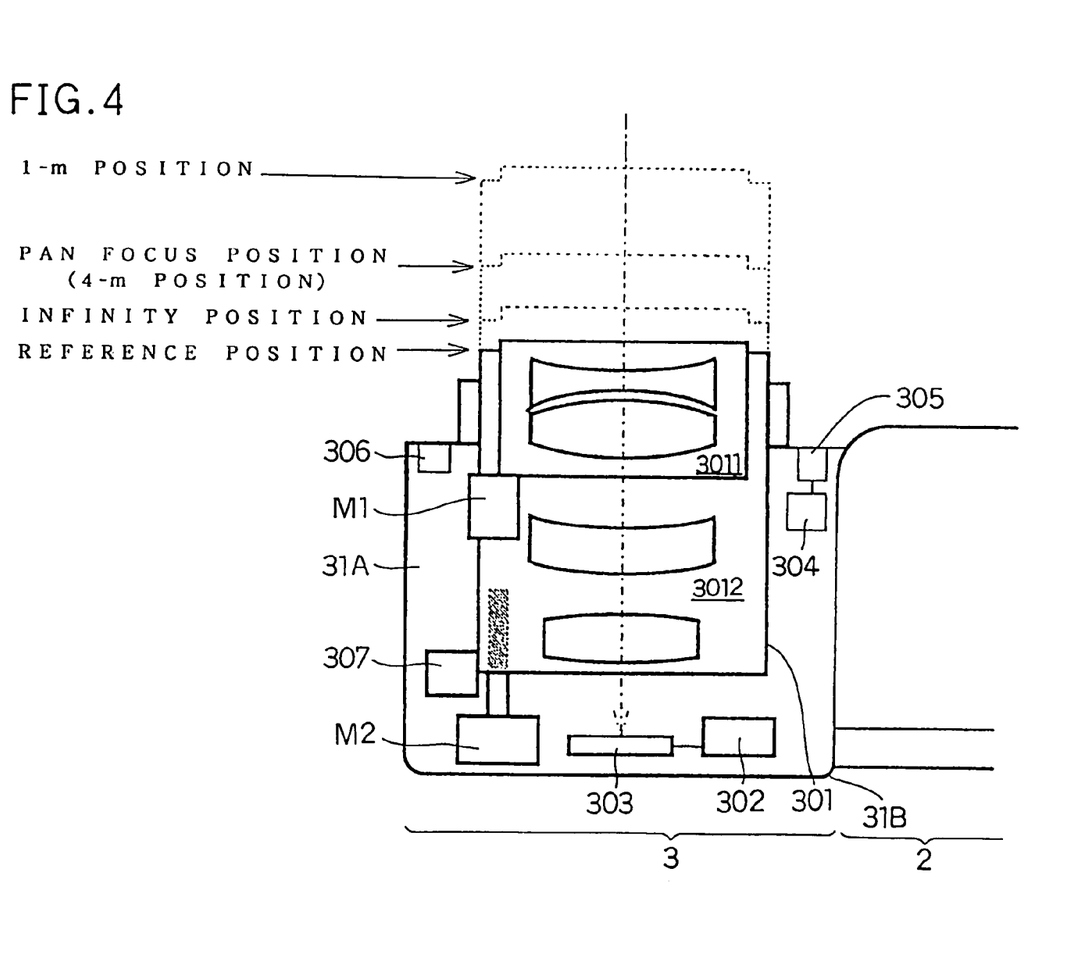
FIG. 4 shows the internal structure of an image sensing unit.

The internal structure of the image sensing unit main body 31A will be described with reference to FIG. 4. The taking lens (standard macro zoom lens) 301 is disposed in the image sensing unit main body 31A. The taking lens 301 has the front lens unit 3011 for changing the focal length and a rear lens unit 3012 for focusing. The focal length is changed by moving the front lens unit 3011. Focusing is performed by moving the front lens unit 3011 and the rear lens unit 3012 (that is, the entire taking lens 301).

An image sensing circuit 302 having a CCD color area sensor (hereinafter, referred to as "CCD") 303 is disposed in an appropriate position in the rear of the taking lens 301. A light adjust circuit 304 having a sensor 305 for receiving reflected flash light from the subject is disposed in an appropriate position in the image sensing unit 3. Moreover, an AF sensor 306 for measuring the distance to the subject in automatic focusing processing is provided. The sensor 305 is disposed in an appropriate position on the front end surface of the attaching member 31B, and the AF sensor 306 is disposed in an appropriate position on the front end surface of the image sensing unit main body 31A.

A zoom motor M1 for moving the front lens unit 3011 and a focusing motor M2 for moving the entire standard zoom lens 301 are disposed in the image sensing unit main body 31A. Moreover, a reference position detecting sensor 307 for detecting that the taking lens 301 is situated at a reference position is provided.

When the taking lens 301 is moved for focusing, the taking lens 301 is once moved to the reference position and then, moved to an appropriate position with respect to the reference position. The detection of the reference position is necessarily performed only at least once after the power is turned on. It is unnecessary to perform the detection every time the taking lens 301 is moved.

The taking lens 301 of the digital camera of this embodiment is of a so-called retractable-barrel type; that is, when the power to the camera body 2 is turned off, the front lens unit 3011 of the taking lens 301 is retracted into a position closer to the rear lens unit 3012 than the range in which it can achieve focus, i.e. the range within which it is movable in ordinary shooting, and, when the camera body 2 is activated, the front lens unit 3011 moves forward from the retracted position mentioned just above. With this, a zoom lens system elongated in the direction of the optical axis can be employed without the front-to-rear size of the digital camera 1 being increased. When the driving of the camera body 2 is activated, the front lens unit 3011 is set at the shooting position at the wide-angle extremity.

Figure 5:
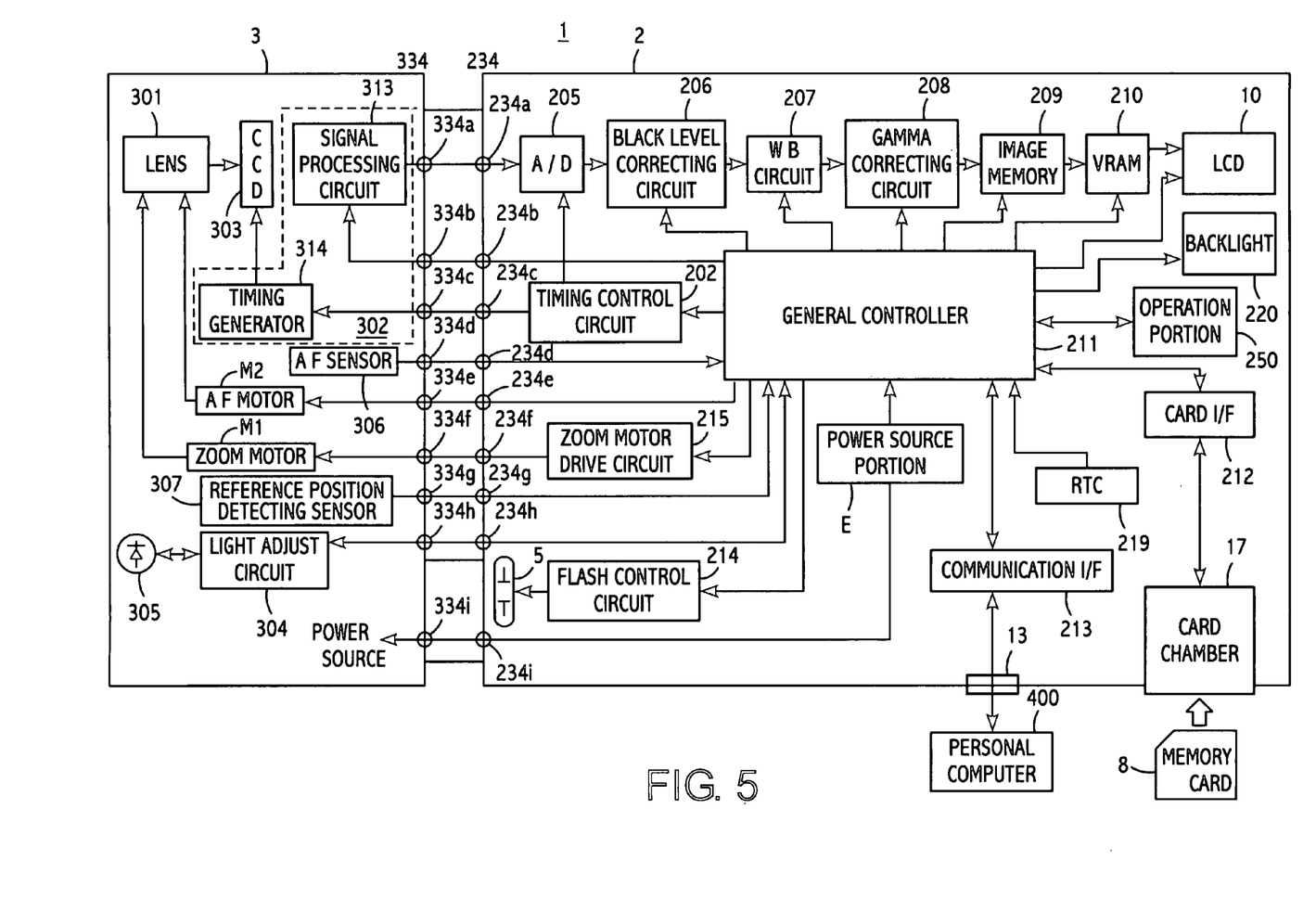
FIG. 5 is a block diagram showing the structure where the image sensing unit is connected to the camera body.

FIG. 5 is a block diagram of the entire digital camera 1 in a condition where the camera body 2 and the image sensing unit 3 are connected. Using this figure, first, the internal block of the image sensing unit 3 will be described. The CCD 303 photoelectrically converts a light image of the subject formed by the taking lens 301 into image signals (signals comprising a string of pixel signals received by pixels) of red (R), green (G) and blue (B) components, and outputs the image signals.

Since the diaphragm is fixed, exposure control in the image sensing unit 3 is performed by adjusting the exposure amount of the CCD 303, that is, the charge accumulation time of the CCD 303 corresponding to the shutter speed. When an appropriate shutter speed cannot be set at a low subject brightness, the levels of the image signals outputted from the CCD 303 are adjusted to thereby compensate for inappropriate exposure due to insufficient exposure. That is, when the brightness is low, exposure control is performed by combination the shutter speed and the gain adjustment. The image signal level adjustment is performed in gain adjustment of an AGC circuit in a signal processing circuit 313.

A timing generator 314 generates a drive control signal for the CCD 303 based on a reference clock transmitted from a subsequently-described timing control circuit 202 in the camera body 2. The timing generator 314 generates clock signals such as integration start/end (exposure start/end) timing signals and signals for controlling reading of light reception signals of pixels (e.g. a horizontal synchronizing signal, a vertical synchronizing signal, and a transfer signal), and outputs the clock signals to the CCD 303.

The signal processing circuit 313 performs a predetermined analog signal processing on the image signals as analog signals outputted from the CCD 303. The signal processing circuit 313 has a CDS (correlated double sampling) circuit and the AGC (automatic gain control) circuit, reduces noise of the image signals by the CDS circuit and adjusts the levels of the image signals by adjusting the gain of the AGC circuit.

The light adjust circuit 304 controls the light emission amount of the built-in flash 5 in flash shooting so as to be a predetermined light emission amount set by the general controller 211. In flash shooting, the reflected flash light from the subject is received by the sensor 305 simultaneously with the start of exposure, and when the light reception amount reaches the predetermined light emission amount, the light adjust circuit 304 outputs a light emission stop signal. In response to the light emission stop signal, the general controller 211 in the camera body 2 forcefully stops the light emission of the built-in flash 5 by a flash control circuit 214, so that the light emission amount of the built-in flash 5 is controlled so as to be the predetermined light emission amount.

The AF sensor 306 is, for example, a known sensor for phase difference detection. Based on the output of the AF sensor 306, the general controller 211 in the camera body 2 measures the distance to the subject and drives the AF motor M2 so that the taking lens moves to a focus position in accordance with the result of the distance measurement. Consequently, automatic focusing that the subject image formed by the taking lens 301 is brought to in-focus state on the CCD 303 is performed.

The above-described image sensing unit 3 and the subsequently-described camera body 2 are electrically connected by nine connecting terminals 334a, 334b, 334c, 334d, 334e, 334f, 334g, 334h and 334i disposed on a connecting terminal surface 334 of the image sensing unit 3 and nine connecting terminals 234a, 234b, 234c, 234d, 234e, 234f, 234g, 234h and 234i disposed on a connecting surface 234 of the camera body 2.

Subsequently, the internal block of the camera body 2 will be described with reference to FIG. 5. The timing control circuit 202 generates the reference clock and clocks for an A/D converting circuit 205 and the timing generator 314 in the image sensing unit 3. The timing control circuit 202 is controlled by the general controller 211.

The A/D converting circuit 205 converts the pixel signals as analog signals into 10-bit digital signals based on an A/D conversion clock inputted from the timing control circuit 202.

A black level correcting circuit 206 corrects the black level of the A/D converted pixel signals (hereinafter, referred to as "pixel data") into a reference black level. A WB (white balance) circuit 207 converts the levels of pixel data of the R, G and B components so that the white balance is also adjusted after gamma correction. The WB circuit 207 uses a level conversion table inputted from the general controller 211 to convert the levels of pixel data of the R, G and B components. The conversion coefficient, i.e. characteristic inclination, of each color component of the level conversion table is set for each shot image by the general controller 211.

A gamma correcting circuit 208 corrects the gamma characteristic of the pixel data. The gamma correcting circuit 208 has six kinds of gamma correction tables with different gamma characteristics, and performs gamma correction of the pixel data based on a predetermined gamma correction table in accordance with the shooting scene and the shooting condition.

An image memory 209 is for storing therein the pixel data outputted from the gamma correcting circuit 208. The image memory 209 has a storage capacity corresponding to one frame. That is, when the CCD 303 has n×m pixels, the image memory 209 has a storage capacity for pixel data corresponding to n×m pixels, and the pixel data are each stored in a corresponding pixel position.

A VRAM 210 is a buffer memory for the image data reproduction-displayed on the LCD 10. The VRAM 210 has a storage capacity for the image data corresponding to the number of pixels of the LCD 10.

In the shooting standby state, after predetermined signal processings are performed by the circuits 205 to 208 on the pixel data of images shot by the image sensing unit 3 every 1/30 second, the pixel data are stored in the image memory 209 and are transferred to the VRAM 210 through the general controller 211 so as to be displayed on the LCD 10. That is, live view display is performed. Consequently, the user can visually confirm the subject image by the image displayed on the LCD 10.

In the reproduction mode, after a predetermined signal processing is performed by the general controller 211 on the image read out from the memory card 8, the image is transferred to the VRAM 210 so as to be reproduction-displayed on the LCD 10. Since transmissive liquid crystal is used for the LCD 10, the image displayed on the LCD 10 can be visually confirmed by projecting light from behind the LCD 10 by a backlight 220. When the backlight 220 is OFF, the image displayed on the LCD 10 can hardly be visually confirmed.

A card I/F 212 is an interface for writing image data onto the memory card 8 and reading image data from the memory card 8. A communication I/F 213 is, for example, a USB-compliant interface for externally connecting a personal computer 400 so that communication can be performed with the personal computer 400.

A flash control circuit 214 controls the execution or no execution, the amount and the timing of light emission of the built-in flash 5 based on a control signal from the general controller 211. A zoom motor drive circuit 215 drives the zoom motor M1 in the image sensing unit 3 based on an instruction from the general controller 211. An RTC 219 is a clock circuit for managing the shooting date and time.

An operation portion 250 includes the above-described UP switch 6, DOWN switch 7, erasing switch D, shutter button 9, FL mode setting switch 11, compression rate setting switch 12, shooting/reproduction mode setting switch 14, LCD switch 15, power switch PS and four-contact switch Z.

A power source portion E comprises four batteries and a power circuit for converting supply voltage for supplying necessary power from the power source to each circuit block, and supplies power to the circuit blocks in the camera body 2 and to the circuit blocks in the image sensing unit 3. By connecting an AC adapter to the camera body 2, commercial AC power can be used as the power source instead of batteries.

The general controller 211 comprises a microcomputer, and performs centralized control of the shooting operation of the digital camera 1 by organically controlling the driving of the members in the image sensing unit 3 and the camera body 2.

The general controller 211 has a brightness determining portion for setting the exposure control value, i.e. shutter speed (SS), and a shutter speed setting portion. The brightness determining portion determines the brightness of the subject by use of the images taken by the CCD 303 every $\frac{1}{30}$ second in the shooting standby state. That is, the brightness determining portion determines the brightness of the subject by use of the image data renewedly stored in the image memory 209.

The brightness determining portion divides the storage area of the image memory 209 into nine blocks, and calculates the brightness data representing each block by use of the pixel data of the G (green) component included in each block.

The shutter speed setting portion sets the shutter speed, i.e. the integration period of time of the CCD 303, based on the result of the subject brightness determination by the brightness determining portion. The shutter speed setting portion has a table of the shutter speed SS.

The shutter speed SS is reset to $\frac{1}{128}$ second when the camera is activated. In the shooting standby state, the shutter speed setting portion changes the shutter speed from the initial value to the high speed side or to the low speed side in steps in accordance with the result of the subject brightness determination by the brightness determining portion.

To perform appropriate setting of the shutter speed SS, the gamma correction and subsequently-described filtering correction in accordance with the shooting scene, the general controller 211 has a scene determining portion for determining a shooting scene from among the following four scenes: "low-brightness scene"; "middle-brightness normal scene"; "middle-brightness backlight scene"; and "high-brightness scene". The "low-brightness" scene is a shooting scene normally requiring auxiliary light by the flash like indoor shooting and nighttime shooting. The "middle-brightness normal scene" is a shooting scene in which shooting can be performed with no auxiliary light because the light (including ambient light and artificial light) illuminating the subject is not backlight and the brightness is appropriate. The "middle-brightness backlight scene" is a shooting scene in which it is desirable to fire the flash because the subject is backlit although the overall brightness is appropriate. The "high-brightness" scene is a shooting scene in which the brightness is very high like a beach in fine weather and a ski slope.

Further, the general controller 211 has an image determining portion for determining whether or not a sensed image is a normal shot image such as an image of a person, a landscape or the like (hereinafter, the shot images of this type will be referred to as "natural images") or an image of letters, a chart or the like drawn on a board (hereinafter, images similar to binary images of this type will be referred to as "letter image").

The image determining portion creates a histogram of brightness data of the pixels based on the pixel data constituting a sensed image stored in the image memory 209, and determines the content of the sensed image based on the histogram. Generally, in the case of a natural image, the histogram of brightness data of the sensed image shows a so-called unimodal distribution in which the number of peak values is one, since brightness distribution bias is small, whereas in the case of a letter image such as an image of letters written on a white board, the histogram shows a bimodal distribution, since there is a bias in brightness distribution in each of the white background portion and the black letter portion. Therefore, the image determining portion 211e determines whether the shot image is a natural image or a letter image by determining whether the histogram of brightness data of the shot image is unimodal or bimodal. The result of the determination is stored in a memory in the general controller 211.

The general controller 211 has a filter portion for performing filtering processing and a recorded image forming portion for forming thumbnail images and compressed images to perform the above-described shot image recording processing, and has a reproduced image forming portion for forming reproduced images to reproduce images recorded on the memory card 8 on the LCD 10.

The filter portion corrects, by a digital filter, a high-frequency component of an image to be recorded to thereby correct the image quality associated with the contour. The filter portion has the following five kinds of digital filters for each of the compression rates K of $\frac{1}{8}$ and $\frac{1}{20}$: a digital filter for performing a normal contour correction, and two kinds of digital filters for enhancing the contour and two kinds of digital filters for weakening the contour with respect to the normal contour correction.

The recorded image forming portion reads out pixel data from the image memory 209 and forms thumbnail images and compressed images to be recorded onto the memory card 8. The recorded image forming portion reads out pixel data from the image memory 209 every eight pixels both in the horizontal and the vertical directions while performing scanning in a raster scanning direction, and successively transfers the pixel data to the memory card 8, thereby recording the thumbnail images onto the memory card 8 while forming them.

Moreover, the recorded image forming portion reads out all the pixel data from the image memory 209 and performs predetermined JPEG compression processings such as two-dimensional discrete cosine transformation and Huffman coding on the pixel data to generate image data of the compressed image, and records the compressed image data into a regular image area of the memory card 8.

When a shooting instruction is given by the shutter button 9 in the shooting mode, the general controller 211 forms a thumbnail image and a compressed image, JPEG-compressed at the compression rate K set by the compression rate setting switch 12, of the image taken into the image memory 209 after the shooting instruction is given, and records these images onto the memory card 8 together with tag information on the shot image (information such as frame number, exposure value, shutter speed, compression rate K, shooting date, ON or OFF of the flash at the time of shooting, scene information, and the result of image determination).

Figure 6:
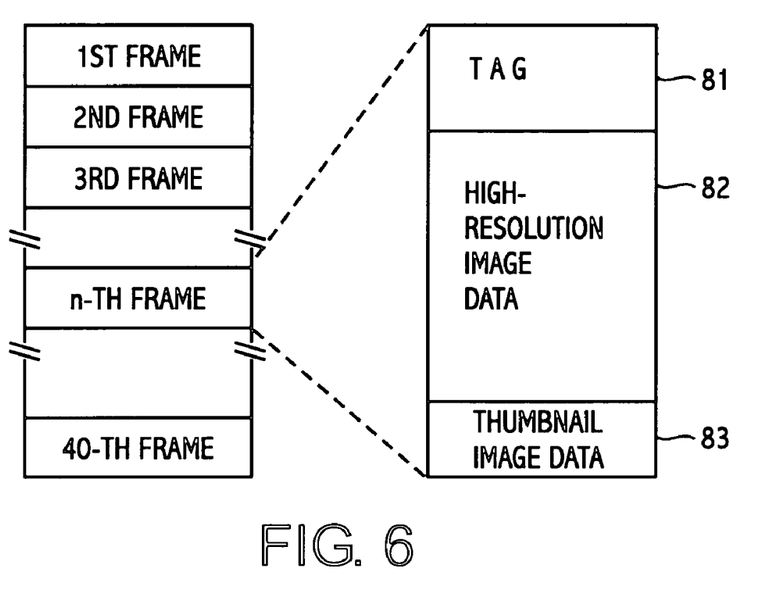
FIG. 6 shows data arrangement in a memory card.

With respect to the images recorded by the digital camera 1, 40 frames of images can be stored when the compression rate is ½0. As shown in FIG. 6, a tag portion 81, JPEG-compressed high-resolution image data (640×480 pixels) 82 and image data (80×60 pixels) 83 for thumbnail display are recorded in each frame. Each frame can be treated as an EXIF-format image file.

When the shooting/reproduction mode setting switch 14 is set to the reproduction mode, the image data with the highest frame number in the memory card 8 is read out, decompressed by the reproduced image forming portion and transferred to the VRAM 210, whereby the image with the highest frame number, that is, the most recently shot image is displayed on the display 10. By operating the UP switch 6, an image with a higher frame number is displayed. By depressing the DOWN switch 7, an image with a lower frame number is displayed.

Figure 7:
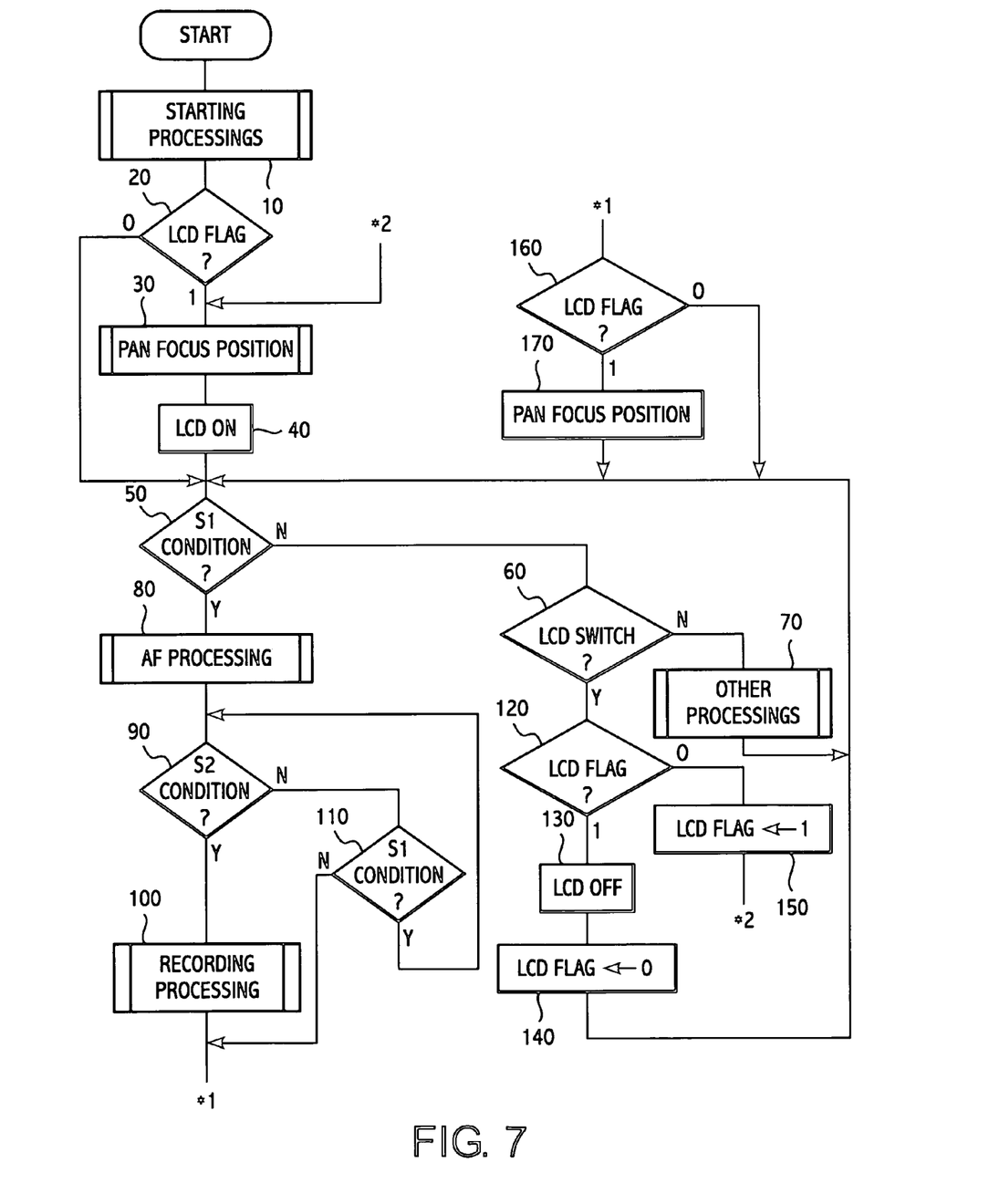
FIG. 7 is a flowchart showing a control performed by a general controller.

The flow of the operation of the general controller 211 will be described with reference to the flowchart shown in FIG. 7. When the power supply is started by an operation of the power switch PS, first, starting processings are performed such as setting of the focus position of the taking lens 301 at the focus position, setting of the zoom position of the taking lens 301 at the wide-angle extremity and initialization of the various parts (step #10).

Then, it is determined whether the LCD flag is 1 or 0 (#20). When it is determined at #20 that the LCD flag is 1 (1 in #20), the taking lens 301 is moved to a focus position where in-focus condition is substantially obtained for distant to close-range views (hereinafter, this focus position is referred to as "pan focus position")(#30). Then, the LCD 10 is turned on (#40). Consequently, an image sensed at pan focus is displayed on the LCD 10. After #40, the process shifts to #50. When it is determined at step #20 that the LCD flag is 0 (0 of #20), the process proceeds to #50 without turning on the LCD 10. By these operations, the LCD 10 is switched between ON and OFF in accordance with the condition immediately before the power supply is stopped.

In this embodiment, the pan focus position is a focus position where in-focus condition is obtained when the distance to the subject is 4 meters. By setting the taking lens 301 at the pan focus position, an in-focus image is obtained for subject distances of 1 meter to infinity.

At #50, it is determined whether the shutter button 9 is in the S1 condition or not, that is, whether the shutter button 9 is half depressed or not. When it is determined at #50 that the shutter button 9 is not in the S1 condition (N of #50), it is determined whether the LCD switch 15 is operated or not (#60). When it is determined at #60 that the LCD switch 15 is not operated (N of #60), other processings such as the above-described live view display are performed (#70). Then, the process returns to #50.

Figure 8:
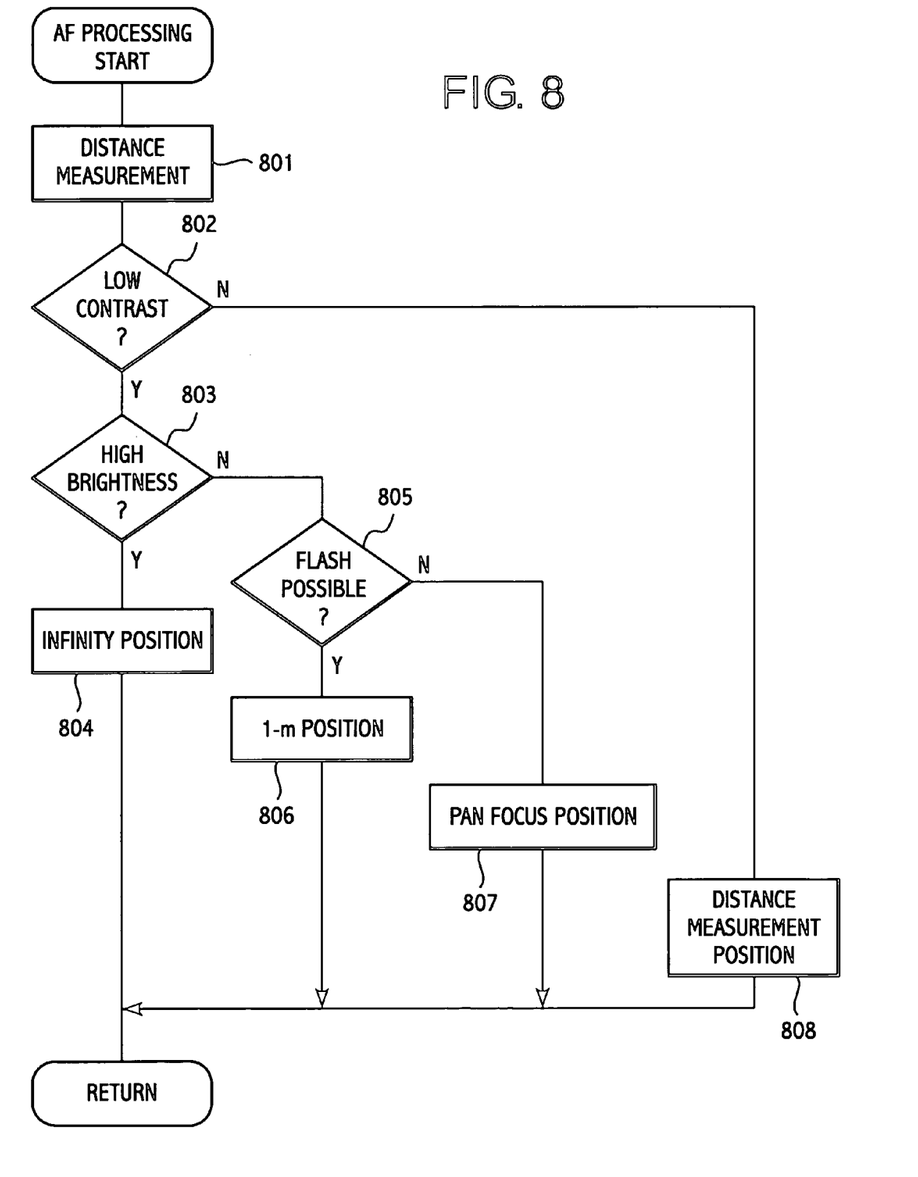
FIG. 8 is a flowchart of an automatic focusing processing.

When it is determined at #50 that the shutter button 9 is in the S1 condition (Y of #50), the process shifts to the automatic focusing processing (#80). In the automatic focusing processing at #80, as shown in the flowchart of FIG. 8, first, the distance to the subject is measured by use of the AF sensor 306 (step #801). When the contrast of the output of the AF sensor 306 is not low (N of #802), the taking lens is moved to a focus position in accordance with the obtained distance (#808) and the automatic focusing processing is ended. When the contrast of the output of the AF sensor 306 is low (Y of #802), it is determined whether the brightness is high or not (whether the output of the AF sensor is high or not) (#803).

When it is determined at #803 that the brightness is high (Y of #803), since the possibility is high that shooting is performed outdoors like landscape shooting, the taking lens 301 is moved to an infinity focus position where in-focus condition is obtained for the subject distance of infinity (#804), and the automatic focusing processing is ended. When it is determined at #803 that the brightness is not high (N of #803), it is determined whether flash light emission is possible at the brightness or not (#805).

When it is determined that the brightness is of a certain degree or higher (Y of #805), since there is a possibility that the subject is situated near, the taking lens 301 is moved to a position where in-focus condition is obtained for a distance of 1 meter (#806) and the automatic focusing processing is ended. When it is determined that the brightness is extremely low (N of #805), since it is considered that the possibility is high that the subject is situated at a distance where flash light emission is useless such as a night scene, the taking lens 301 is moved to a pan focus position (#807) and the automatic focusing processing is ended.

When the automatic focusing processing (#80) is completed, it is determined whether the shutter button 9 is in the S2 condition or not, that is, whether the shutter button 9 is fully depressed or not (#90). When it is determined at #90 that the shutter button 9 is in the S2 condition (Y of #90), the above-described recording processing is performed (#100) and then, the process shifts to step #160. When it is determined at #90 that the shutter button 9 is not in the S2 condition (N of #90), it is determined whether the shutter button 9 is in the S1 condition or not (#110). When it is determined at #110 that the shutter button 9 is in the S1 condition (Y of #110), the process returns to #90. When it is determined at #110 that the shutter button 9 is not in the S1 condition (N of #110), the process shifts to #160.

At #160, it is determined whether the LCD flag is 1 or 0. When the LCD flag is 1 (1 of #160), the taking lens 301 is moved to the pan focus position (#170), and then, the process returns to #50. When the LCD flag is 0 (0 of #160), the process directly returns to #50.

When it is determined at #60 that the LCD switch 15 is operated (Y of #60), it is determined whether the LCD flag is 1 or 0 (#120). When it is determined at #120 that the LCD flag is 1 (1 of #120), the LCD 10 is turned off (#130) and the LCD flag is set to 0 (#140). Then, the process returns to #50.

When it is determined at #120 that the LCD flag is 0 (0 of #120), the LCD flag is set to 1 (#150), and the process returns to #30.

By the above-described operation of the general controller 211, the focus position of the taking lens 301 is the pan focus position when the LCD 10 starts to be driven, so that the possibility that a blurred image is displayed on the LCD 10 is reduced.

Moreover, in this embodiment, when the LCD 10 is on, the focus position of the taking lens becomes the pan focus position immediately after shooting, so that the possibility that a blurred image is displayed on the LCD 10 is further reduced.

Obviously, many modifications and variations of the present invention are possible in light of the above teachings. It is therefore to be understood that within the scope of the appended claims, the invention may be practiced other than as specifically described.

What is claimed is:

1. A camera comprising:
    a storing device for storing a state value to indicate whether display of an image captured is requested or not;
    a taking lens movable between a first focus position in which a far distance object is in-focus condition and a second focus position in which a near distance object is in-focus condition;
    an image sensing device for sensing an optical subject image formed by the taking lens;
    a display device for displaying a subject image sensed by the image sensing device; and
    a controller for driving the taking lens to a third focus position where in-focus condition is substantially obtained for distant to close-range views before display by the display device is started, wherein said driving of the taking lens is performed when power supply to the camera is started and the controller automatically starts driving of the display device after performing said driving of the taking lens if the controller determines that the state value indicates the display is requested when the power supply to the camera is started.

2. A camera as claimed in claim 1, wherein said controller is further configured to drive said taking lens to said focus position when driving of the display device is instructed to start and before actual display by the display device is started.

3. A camera as claimed in claim 2, wherein the display device is instructed to start to drive by manually operating an operation member.

4. A camera body to be used with a taking lens which is movable between a first focus position in which a far distance object is in-focus condition and a second focus position in which a near distance object is in-focus condition, said camera body comprising:
    a storing device for storing a state value to indicate whether display of an image captured is requested or not:
    a display device for displaying an image captured; and
    a controller for controlling image taking so that a captured image through the taking lens becomes substantially in-focus condition for distant to close-range views before automatically starting the display of the captured image by the display device, wherein said controlling is performed when power supply to a camera including the camera body is started if the controller determines that the state value indicates the display is requested.

5. A camera body as claimed in claim 4,
    wherein the display device receives the image from a taking unit comprising a taking lens and an image sensing device for sensing an image formed by the taking lens, and
    wherein the controller performs said controlling by setting the taking lens at a focus position where in-focus condition is substantially obtained for distant to close-range views.

6. A camera body as claimed in claim 4, wherein said controller controls image taking so that said in-focus condition is substantially obtained when driving of the display device is instructed to start and before actual display by the display device is started.

7. A display control method in a digital camera having a display device, comprising the steps of
    determining, based on a stored state value, whether display of an image captured is requested or not when power supply to the camera is started;
    if the stored state value indicates the display is requested when the power supply to the camera is started, automatically driving a taking lens to a focus position where in-focus condition is substantially obtained for distant to close-range views; and
    when the display is requested, after the taking lens has reached said focus position, automatically starting the display of an image taken through the taking lens situated at said focus position.

8. The method of claim 7, wherein said state value is settable.

9. The method of claim 7, wherein said step of displaying occurs automatically.

* * * * *